United States Patent
Bavor, Jr. et al.

(10) Patent No.: US 12,526,566 B2
(45) Date of Patent: Jan. 13, 2026

(54) GENERATING MICROPHONE ARRAYS FROM USER DEVICES

(71) Applicant: Google LLC, Mountain View, CA (US)

(72) Inventors: Clayton Woodward Bavor, Jr., Mountain View, CA (US); Alex Olwal, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 214 days.

(21) Appl. No.: 18/240,990

(22) Filed: Aug. 31, 2023

(65) Prior Publication Data

US 2024/0073571 A1    Feb. 29, 2024

Related U.S. Application Data

(60) Provisional application No. 63/374,189, filed on Aug. 31, 2022.

(51) Int. Cl.
| | |
|---|---|
| *H04R 1/08* | (2006.01) |
| *G06V 10/24* | (2022.01) |
| *H04R 3/00* | (2006.01) |
| *H04S 7/00* | (2006.01) |

(52) U.S. Cl.
CPC ............. *H04R 1/08* (2013.01); *G06V 10/245* (2022.01); *H04R 3/005* (2013.01); *H04S 7/40* (2013.01); *G06V 2201/07* (2022.01); *H04R 2201/401* (2013.01); *H04R 2203/12* (2013.01); *H04R 2499/10* (2013.01); *H04S 2400/11* (2013.01); *H04S 2400/15* (2013.01)

(58) Field of Classification Search
CPC .... H04R 1/08; H04R 3/005; H04R 2201/401; H04R 2203/12; H04R 2499/10; H04S 7/40; H04S 2400/11; H04S 2400/15; G06V 2201/07; G06V 10/245
USPC .............................................. 381/56, 58, 122
See application file for complete search history.

(56) References Cited

U.S. PATENT DOCUMENTS

| | | | |
|---|---|---|---|
| 10,979,806 B1 | 4/2021 | Johnson et al. | |
| 2012/0182429 A1* | 7/2012 | Forutanpour | H04R 3/005 381/92 |
| 2014/0136203 A1* | 5/2014 | Liu | H04S 7/40 704/246 |
| 2015/0188997 A1 | 7/2015 | Park et al. | |
| 2020/0037068 A1 | 1/2020 | Barnett et al. | |
| 2022/0078547 A1 | 3/2022 | Mccowan et al. | |

(Continued)

OTHER PUBLICATIONS

Spitler, "Applying Ultra-Wideband Wireless Technology for Security and Automation", SIA Technology Insights, retrieved on Apr. 25, 2022 from https://www.securityindustry.org/2020/11/17/applying-ultra-wideband-wireless-technology-for-security-and-automation/, Nov. 17, 2020, 10 pages.

*Primary Examiner* — William A Jerez Lora
(74) *Attorney, Agent, or Firm* — Brake Hughes Bellermann LLP

(57) ABSTRACT

A method of generating a virtual microphone array according including identifying a plurality of microphones, identifying a relative position in space of each of the plurality of microphones, generating a virtual microphone array based on the plurality of microphones and the relative position in space of each of the plurality of microphones, sensing audio at each of the plurality of microphones, and generating an audio signal of the virtual microphone array based on the sensed audio.

20 Claims, 7 Drawing Sheets

(56) References Cited

U.S. PATENT DOCUMENTS

| | | | |
|---|---|---|---|
| 2023/0133265 A1* | 5/2023 | Springer | H04N 7/147 348/14.03 |
| 2023/0308822 A1* | 9/2023 | Radisavljevic | H04S 7/30 |

\* cited by examiner

GENERATING MICROPHONE ARRAYS FROM USER DEVICES

CROSS-REFERENCE TO RELATED APPLICATION

This application claims priority to U.S. Provisional Patent Application No. 63/374,189, filed on Aug. 31, 2022, entitled "GENERATING MICROPHONE ARRAYS FROM USER DEVICES", the disclosure of which is incorporated by reference herein in its entirety.

TECHNICAL FIELD

This description relates in general to mobile devices and microphones embedded in the devices and using them in concert in various applications.

BACKGROUND

A microphone array is a sensor device that detects acoustic waves from a plurality of directions using multiple microphones. For example, a common microphone array is a two-microphone array device, with one microphone placed on the left side of the device and the other placed on the right side. With one microphone on each side, sounds can be recorded from both the left and right side of a room, making for a dynamic stereo recording which mimics surround sound. When played back on a stereo headset, the separate left and right channel recording are distinctly different and can be noticeably heard.

SUMMARY

Implementations described herein are related to forming a virtual microphone array using microphones from user devices a user has in their possession. In some implementations, such a virtual microphone array may be used as part of a telepresence videoconference.

In one general aspect a method comprises identifying a plurality of microphones, each of the plurality of microphones being disposed on and connected to a corresponding user device of a plurality of user devices; determining a position in space and an orientation of each of the plurality of microphones; determining a plurality of beams of a beamforming pattern along which acoustic energy propagates toward the plurality of microphones, the beamforming pattern being based on the position in space and the orientation of each of the plurality of microphones; selecting a beam of the plurality of beams from which to acquire the acoustic energy propagating toward the plurality of microphones; and recording audio resulting from the acoustic energy acquired from the sampled beam.

In another general aspect, a computer program product comprising a nontransitory storage medium, the computer program product including code that, when executed by processing circuitry, causes the processing circuitry to perform a method, the method comprising identifying a plurality of microphones, each of the plurality of microphones being disposed on and connected to a corresponding user device of a plurality of user devices; determining a position in space and an orientation of each of the plurality of microphones; determining a plurality of beams of a beamforming pattern along which acoustic energy propagates toward the plurality of microphones, the beamforming pattern being based on the position in space and the orientation of each of the plurality of microphones; selecting a beam of the plurality of beams from which to acquire the acoustic energy propagating toward the plurality of microphones; and recording audio resulting from the acoustic energy acquired from the sampled beam.

In another general aspect, an apparatus comprises memory and processing circuitry coupled to the memory, the processing circuitry being configured to identify a plurality of microphones, each of the plurality of microphones being disposed on and connected to a corresponding user device of a plurality of user devices; determine a position in space and an orientation of each of the plurality of microphones; determine a plurality of beams of a beamforming pattern along which acoustic energy propagates toward the plurality of microphones, the beamforming pattern being based on the position in space and the orientation of each of the plurality of microphones; select a beam of the plurality of beams from which to acquire the acoustic energy propagating toward the plurality of microphones; and record audio resulting from the acoustic energy acquired from the sampled beam.

The details of one or more implementations are set forth in the accompanying drawings and the description below. Other features will be apparent from the description and drawings, and from the claims.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations.

Figure 1:
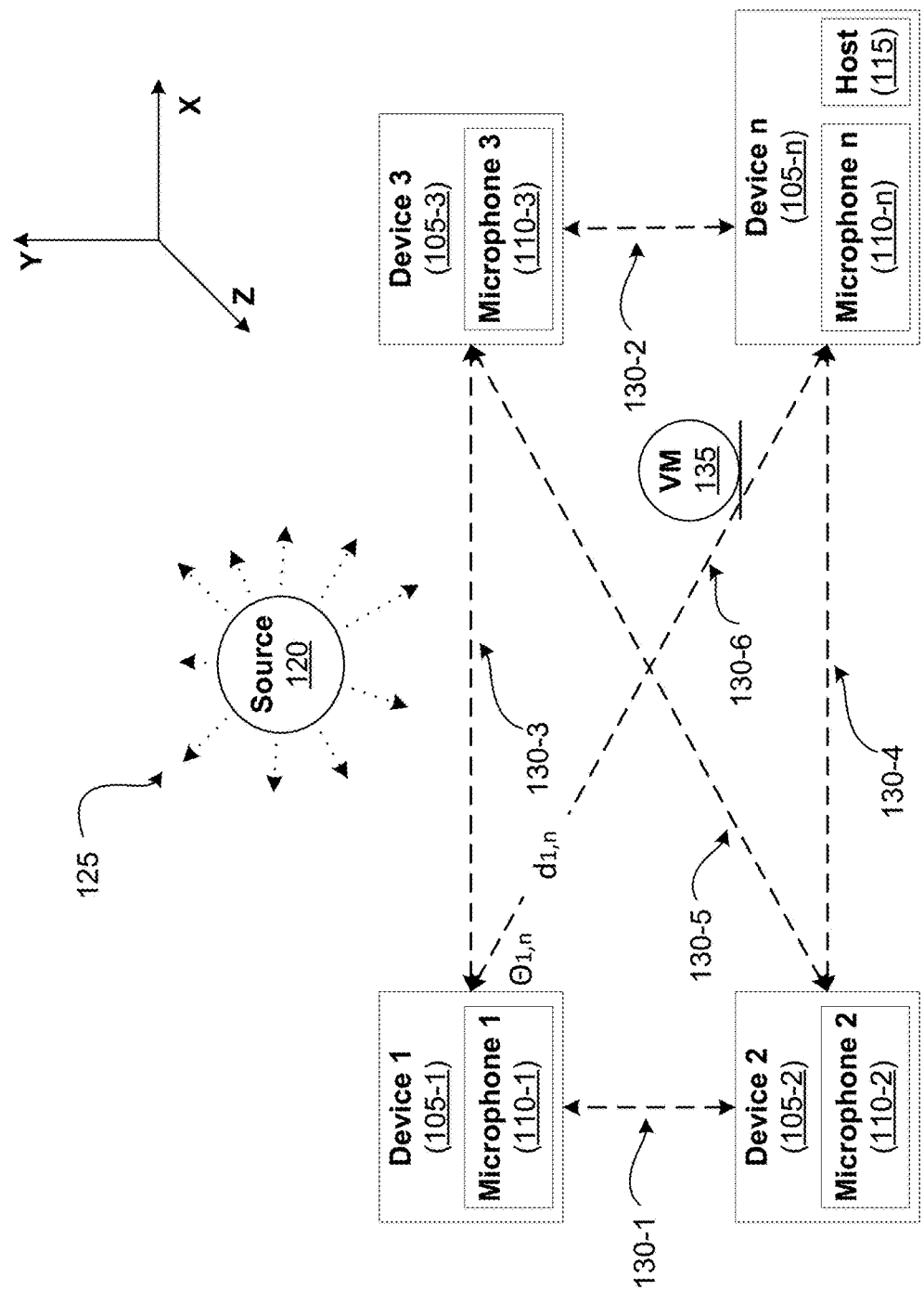
FIG. 1 illustrates an example of user devices forming a virtual microphone array.

It should be noted that these Figures are intended to illustrate the general characteristics of methods, and/or structures utilized in certain example implementations and to supplement the written description provided below. These drawings are not, however, to scale and may not precisely reflect the precise structural or performance characteristics of any given implementation and should not be interpreted as defining or limiting the range of values or properties encompassed by example implementations. For example, the positioning of modules and/or structural elements may be reduced or exaggerated for clarity. The use of similar or identical reference numbers in the various drawings is intended to indicate the presence of a similar or identical element or feature.

DETAILED DESCRIPTION

This disclosure relates to forming a virtual microphone array from multiple microphones distributed across user devices such as smartphones, smartwatches, smartglasses, laptop computers, tablet computers, and the like.

As mentioned above, a microphone array is a sensor device that detects acoustic waves from a plurality of directions using multiple microphones. In a two-microphone array device, with one microphone placed on the left side of the device and the other placed on the right side, sounds can be recorded from both the left and right side of a room, making for a dynamic stereo recording which mimics surround sound. These microphones can then be used to allow the sound capture to be more sensitive to sounds coming from one or more specific directions, using a technique known as beamforming.

Conventional microphone arrays are designed using a device with fixed microphones in known positions (and orientations). Conventional microphone arrays use multiple microphones arranged in a specified pattern to provide beamforming. The beamforming generates degrees of directionality that address each of the above-described scenarios and provide the ability to record desired speech while excluding undesired speech.

A technical problem with conventional microphone arrays is that the arrays are fixed in location with respect to one another and are accordingly specialized equipment that is inconvenient and costly for the average user.

A technical solution to the above-described technical problem includes forming a microphone array from a plurality of at least two user devices. For example, a user on the go may have a smartphone and a laptop. Each of the smartphone and laptop has a microphone. Because the microphone on the smartphone and the microphone on the laptop face the user at different angles, it is possible that the audio recorded from each of the microphones can be used as a microphone array to provide enhanced directionality in contrast to the microphones acting as separate entities. Example implementations are directed to leveraging arbitrary microphones in the environment or worn by the user, which can transmit time-synchronized audio to a computing system. The computing system uses one or a plurality of mechanisms to track the relative position (and possibly orientation) of those microphones, allowing it to create on-the-fly beamforming to optimize the directional response for the application's needs. An example involves using microphones on a phone and in a user's glasses to suppress ambient sounds but amplify sound from the direction in front of the user—such as a conversation partner.

A technical advantage of the technical solution is that beamforming for desired directionality may be achieved from devices in the possession of a user without the need for specialized equipment.

FIG. 1 illustrates an example of user devices forming a virtual microphone array. In FIG. 1, four (4) devices are shown; however, two (2) or more devices may be used to form a virtual microphone array. As shown in FIG. 1, a system can include a plurality of devices, each including a microphone. For example, FIG. 1 illustrates four (4) devices including device 1 105-1, device 2 105-2, device 3 105-3, and device n 105-$n$. Further, FIG. 1 illustrates device 1 105-1 includes microphone 1 110-1, device 2 105-2 includes microphone 2 110-2, device 3 105-3 includes microphone 3 110-3, and device n 105-$n$ includes microphone n 110-$n$. In FIG. 1, one (1) microphone per device is shown; however, one (1), two (2), or more microphones may be included in each device 105-1, 105-2, 105-3, 105-$n$.

In an example implementation, a virtual microphone array, VM 135, can be generated by a host 115. In an example implementation, the host 115 can be included in one of the devices including a microphone. For example, FIG. 1 illustrates the host 115 being included in device n 105-$n$. In an alternative, or additional, implementation, the host can be a standalone (e.g., separate from the devices including a microphone) device and/or included in a standalone device.

Spatial filtering or beamforming can be used to generate an audio signal representing VM 135. Beamforming can use a weighted combination of two or more microphone (e.g., microphone 110-1, 110-2, 110-3, 110-$n$) signals to achieve a particular directivity pattern. The output (representing VM 135), $Z(j\omega)$, of a beamformer in the complex frequency domain can be given by:

$$Z(j\omega)=(w(j\omega))^T y(j\omega), \quad (1)$$

where $w(j\omega)=[W_0(j\omega), (j\omega), W_{M-1}(j\omega)]$ T is the vector of complex weights for each microphone, and $y(j\omega)=[Y_0(j\omega), Y_1(j\omega), Y_{M-1}(j\omega)]$ T is the vector of microphone signals.

The vector of microphone signals $y(j\omega)$ can have a distance d and an angle $\theta$ associated with each microphone 110-1, 110-2, 110-3, 110-$n$ and/or device 105-1, 105-2, 105-3, 105-$n$. The distance d and the angle $\theta$ can be multi-directional in that the distance d and the angle $\theta$ can be from any microphone 110-1, 110-2, 110-3, 110-$n$ and/or device 105-1, 105-2, 105-3, 105-$n$ to any microphone 110-1, 110-2, 110-3, 110-$n$ and/or device 105-1, 105-2, 105-3, 105-$n$. For example, the distance $d_{1,n}$ and the angle $\theta_{1,n}$ can represent the microphone signal vector between device 1 105-1, microphone 1 110-1 and device n 105-$n$, microphone n 110-$n$. As shown in FIG. 1, lines 130-1, 130-2, 130-4, 130-5, 130-6 represent the microphone signal vector between the devices and/or microphones. Accordingly, lines 130-1, 130-2, 130-4, 130-5, 130-6 can have (but not shown) a corresponding distance d and angle $\theta$ in both directions.

In some implementations, distance d and angle $\theta$ can be variable. In some implementations, distance d and angle $\theta$ can vary along any axis x, y, z. For example, device 1 105-1 can be held by a user while the user is walking around. Therefore, the distance $d_{1,n}$ and the angle $\theta_{1,n}$ can vary as the user moves. Accordingly, in some implementations, the distance $d_{1,n}$ and the angle $\theta_{1,n}$ can be measured and communicated. In some implementations, distance d and angle $\theta$ can be measured and communicated between each of the plurality of devices forming the virtual microphone. In some implementations, distance d and angle $\theta$ can be measured and communicated to the host 115 and/or the device (e.g., device n 105-$n$) including the host 115.

In some implementations, source 120 can generate audio signals 125 in any direction. In some implementations, two or more of microphones 110-1, 110-2, 110-3, 110-$n$ can detect audio signals 125. An audio signal representing VM 135 based on the detected audio signals can be generated using the beamforming technique described above.

Figure 2A:
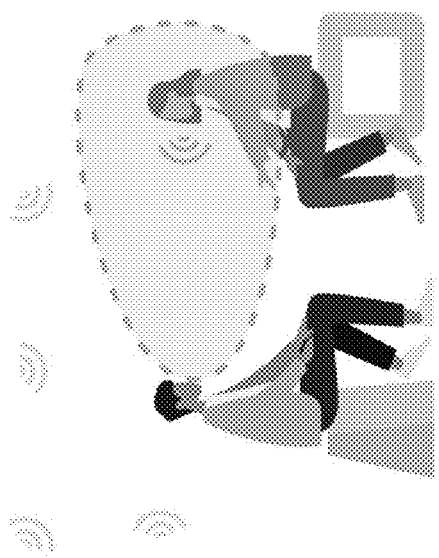
FIGS. 2A, 2B, 2C, 2D, 2E, and 2F illustrate example scenarios in which beamforming can be used to improve directionality of microphones distributed across user devices.
Figure 2B:
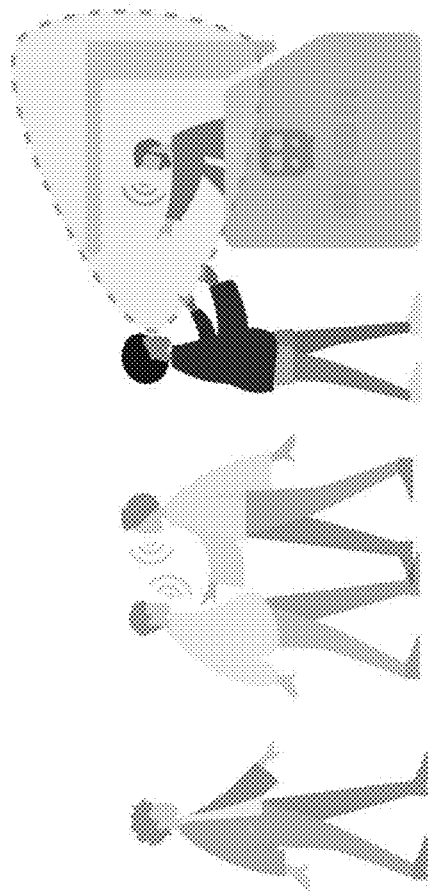
Figure 2C:
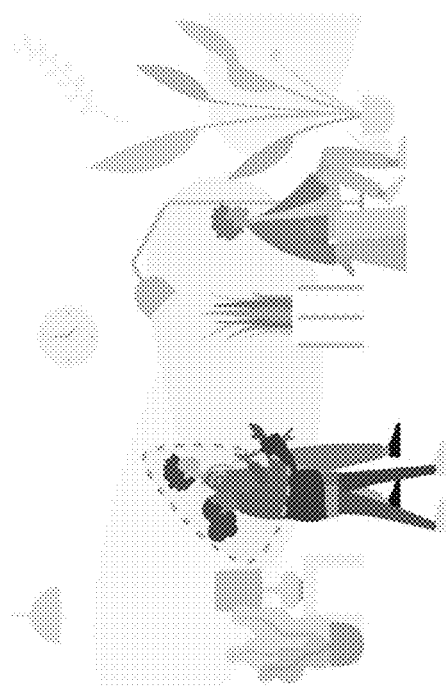
Figure 2D:
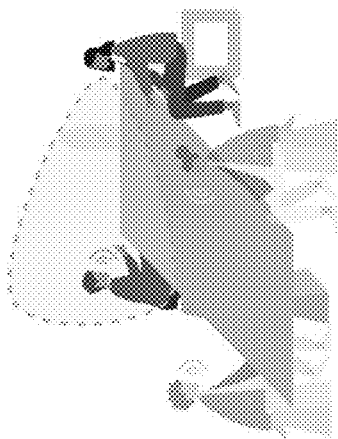
Figure 2E:
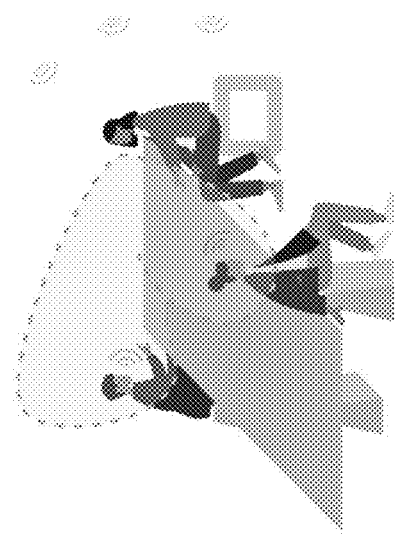
Figure 2F:
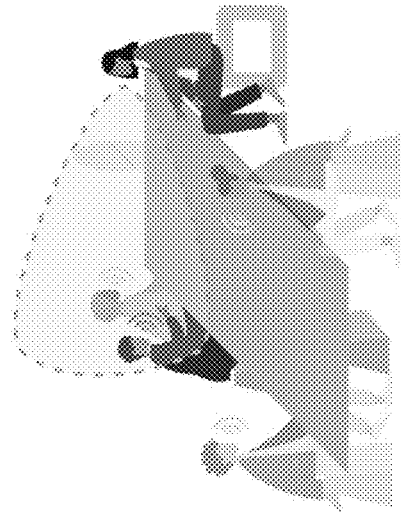

FIG. 2A illustrates a first scenario in which multiple microphones are useful in recording audio. In FIG. 2A, it is desired to exclude a user's own speech as well as any ambient noise to focus on a subject's speech. FIG. 2B illustrates a second scenario in which multiple microphones are useful in recording audio. In FIG. 2B, it is desired to focus on a speaker in front of a user while ignoring speech behind. FIG. 2C illustrates a first scenario in which multiple microphones are useful in recording audio. In FIG. 2C it is desired to focus on a person adjacent to a user in conversation while sitting or walking. FIG. 2D illustrates a first scenario in which multiple microphones are useful in recording audio. In FIG. 2D, it is desired to focus on a speaker in front of a user and ignore any conversations in the periphery. FIG. 2E illustrates a first scenario in which multiple microphones are useful in recording audio. In FIG. 2E, it is desired to provide a segmented transcription of multiple speakers in front or beside a user. FIG. 2F illustrates a first scenario in which multiple microphones are useful in recording audio. In FIG. 2F, it is desired to provide a segmented transcription of multiple speakers in close proximity to each other.

The number of user devices that may be used to form larger microphone arrays that can construct increasingly precise directionality. For example, in addition to the smartphone and laptop, the user may also have a pair of augmented reality (AR) smartglasses. This example scenario is illustrated in FIG. 3.

Figure 3:
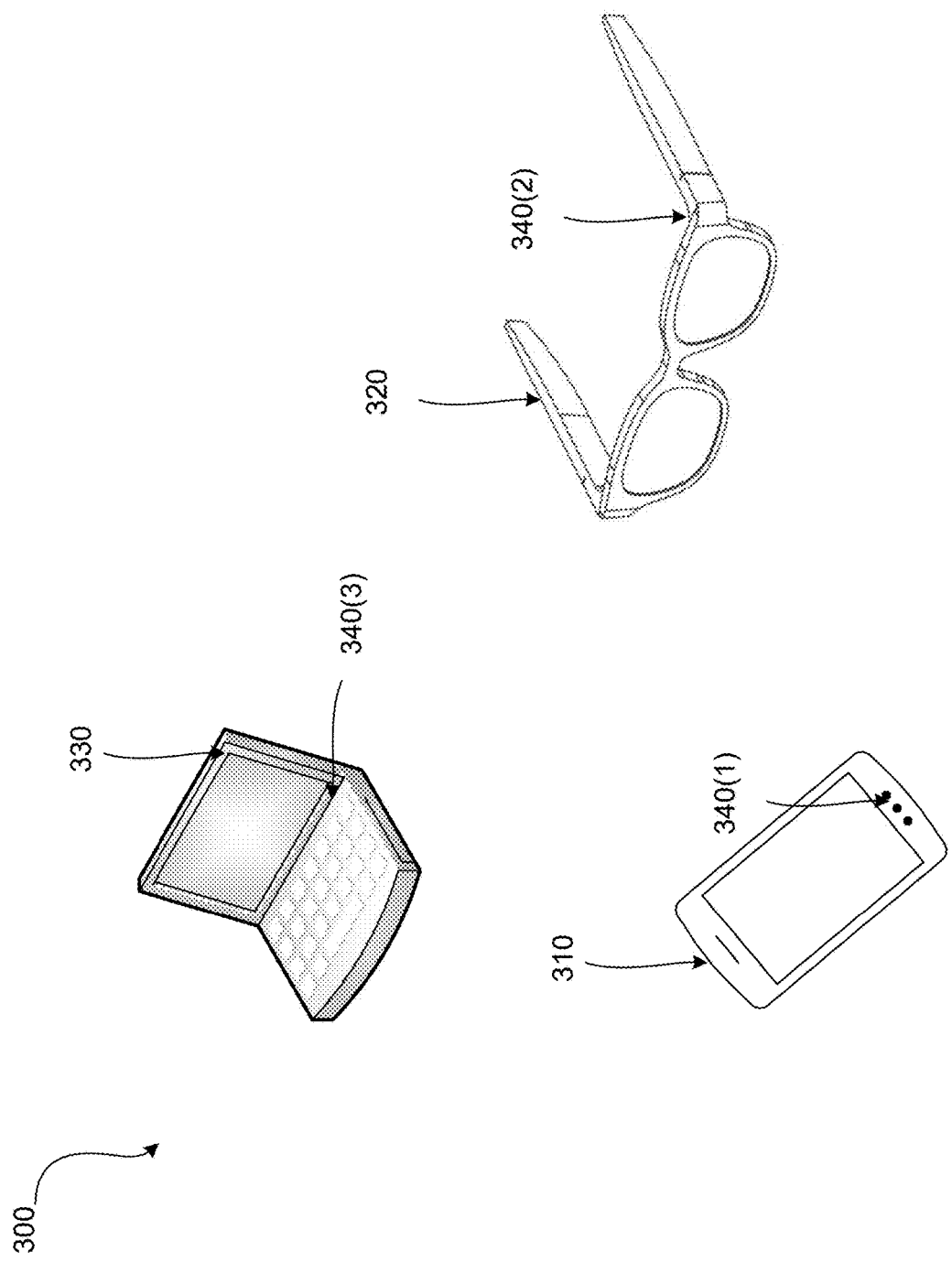
FIG. 3 illustrates an example set of user devices for a virtual microphone array.

FIG. 3 illustrates an example arrangement for configuring a virtual microphone array 300. In the arrangement 300, there is a smartphone 310, AR smartglasses 320, and a laptop 330, with corresponding microphones 340(1), 340(2), and 340(3).

To begin the configuration of the virtual microphone array 300, a host or anchor device identifies user devices, e.g., user devices 310, 320, and 330, in the vicinity of the anchor that may belong to a user. In some implementations and as illustrated in FIG. 3, the anchor device is the smartphone 310. The identification may be performed over a local area network, e.g., wireless network (WiFi), or a cellular network. The user may confirm that the user devices belong to the user and are to be included in the virtual microphone array 300.

The anchor device 310 is configured to track the respective positions and orientations of each of the devices 310, 320, and 330. The tracked positions and orientations of the devices 310, 320, and 330 may then be input by the host into a model that outputs a beamforming configuration for a virtual microphone array.

In some implementations, the model is formed based on a set of training data. The training data includes images of devices such as devices 310, 320, 330, and indications of positions and orientations of their microphones. For example, the training data may be used to build a predictive model that outputs a position and orientation of a microphone given an image of the user device. In some implementations, the model includes a convolutional neural network (CNN) that is configured to generate a probability that a certain image indicates a position and an orientation of a microphone.

Other tracking techniques used to determine position and orientation include using ultra-wideband radiation scattered off the user devices 310, 320, 330. In this case, the scattered data may also provide training data for a model, i.e., a signature scattered signal may be associated with a position and orientation of a microphone. Still others include Bluetooth, WiFi positioning, and ultrasound audio.

The anchor device/host, e.g., 310, may then perform beamforming based on the position and orientation of each of the user devise 310, 320, 330. For example, each of the microphones 340(1..3) detects audio when at a particular position and orientation as determined from the model. The host/anchor device, however, may use the virtual microphone array to provide beamforming to define a set of beams along which the audio propagates and is recorded. For directionality, the host/anchor device may then create a particular beam that enhances some audio energy and degrades other audio energy. This allows, for example, for the scenarios in FIG. 1 to come into fruition.

Figure 4:
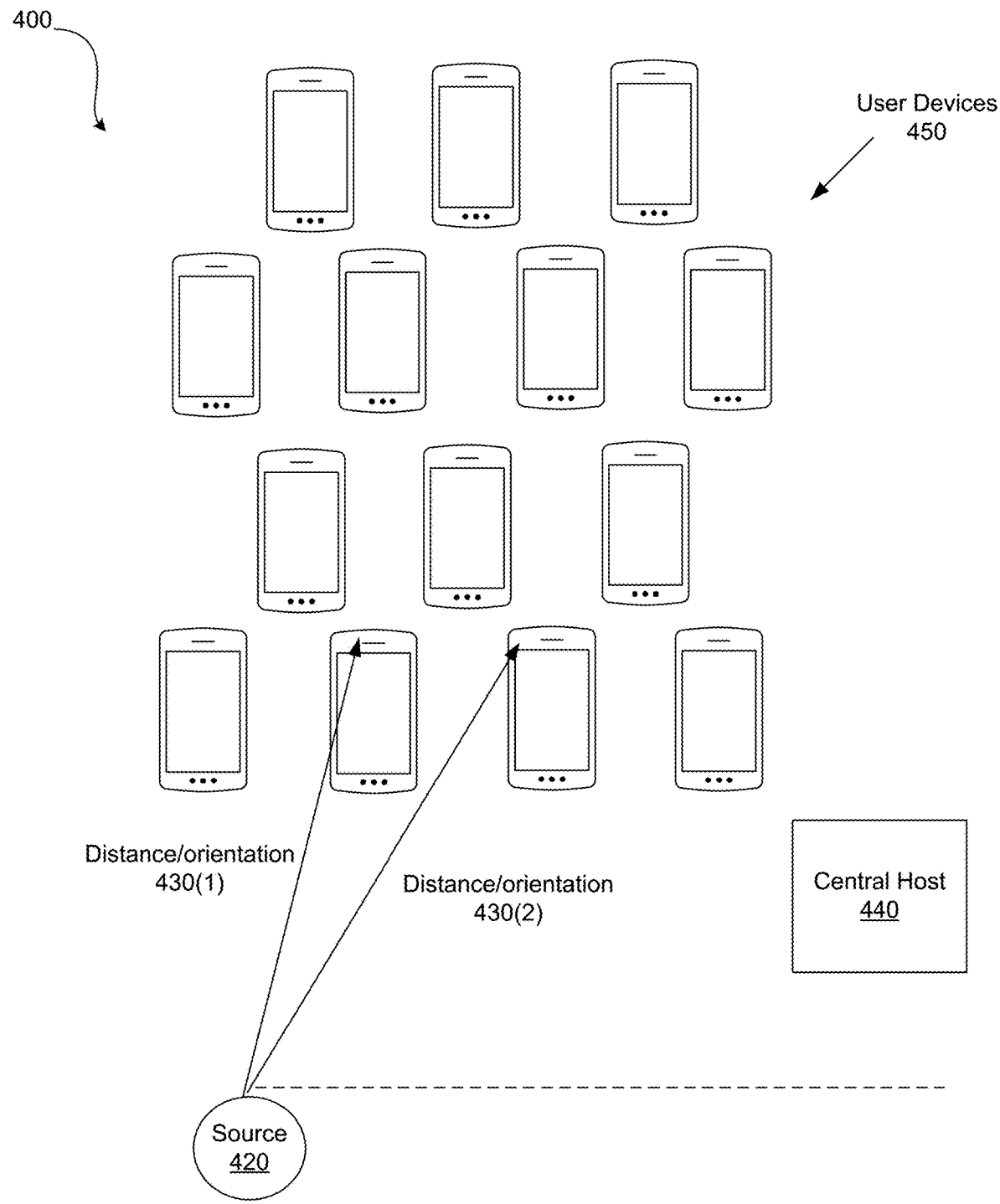
FIG. 4 illustrates an example virtual microphone array for beamforming.

FIG. 4 illustrates another example virtual microphone array for beamforming. In the example shown in FIG. 4, there is a plurality of user devices 450 (shown as smartphones but can be any user device) recording audio from an audio source 420 at distances and orientations 430(1..2) from the source 420. In the case shown in FIG. 4, there is a central host 440 separate from the user devices 450 that performs the model training, building, and evaluation. The resulting model evaluated from the central host 440 selects audio in the direction of the source 420 (i.e., selects a beam strongest in the direction of the source 420) and suppresses audio in other directions (i.e., ignores beams stronger in directions away from the source 420).

It is understood that the user device 450 may move continuously and accordingly the host will need to continuously update the beamforming for the virtual array to create the beam(s) along which the audio from the source propagates. The model used accordingly should be compact enough to be evaluated in real time.

Example 1

Figure 5:
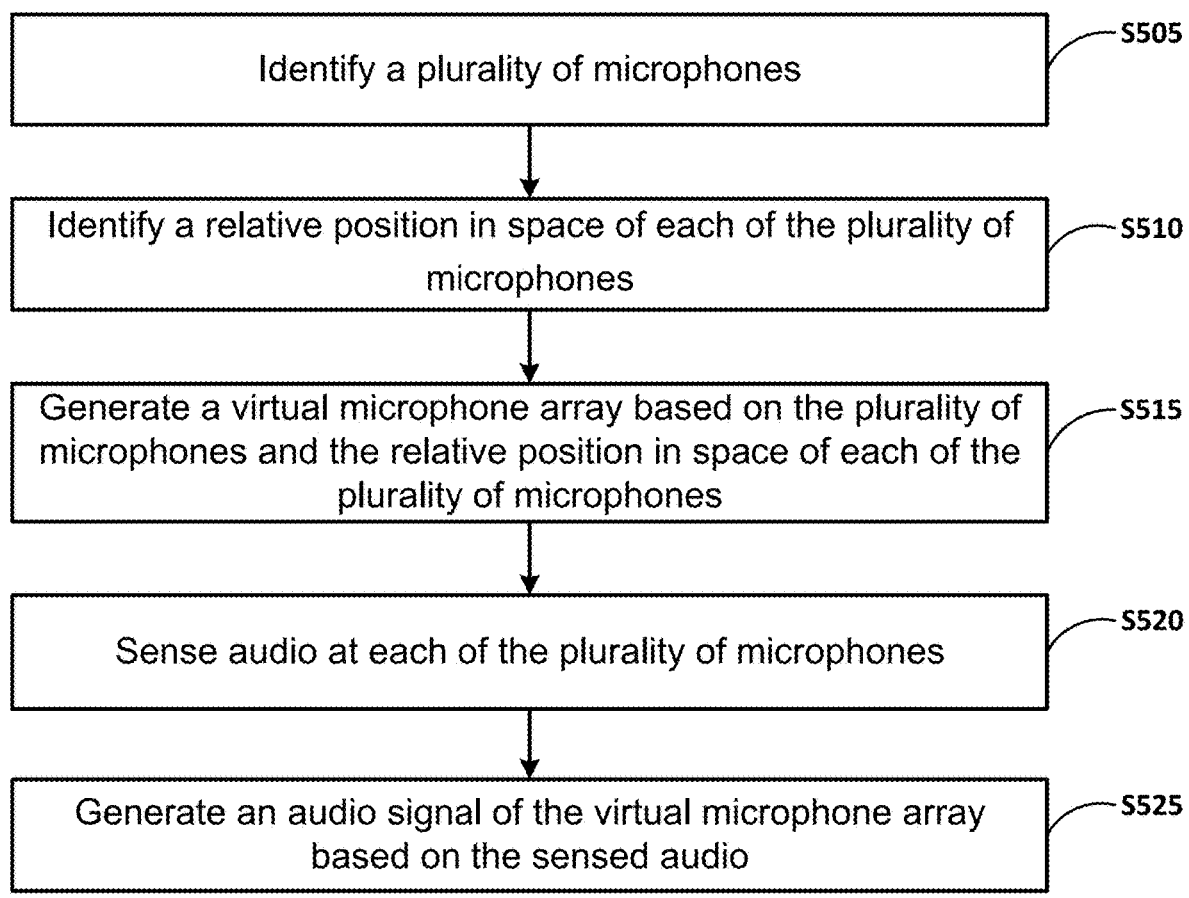
FIG. 5 illustrates a block diagram of an example method of generating a virtual microphone array.

FIG. 5 illustrates a block diagram of an example method of generating a virtual microphone array according to an example implementation. As shown in FIG. 5, in step S505 identify a plurality of microphones. In step S510 identify a relative position in space of each of the plurality of microphones. In step S515 generate a virtual microphone array based on the plurality of microphones and the relative position in space of each of the plurality of microphones. In step S520 sense audio at each of the plurality of microphones. In step S525 generate an audio signal of the virtual microphone array based on the sensed audio.

Example 2

The method of Example 1, wherein the relative position in space of each of the plurality of microphones can be a first relative position in space, the method can further include identifying a second relative position in space of each of the plurality of microphones, modifying the virtual microphone array based on the second relative position in space of each of the plurality of microphones, sensing audio at the plurality of microphones, and generating an audio signal of the modified virtual microphone array based on the sensed audio.

Example 3

The method of Example 1, wherein identifying the relative position in space of each of the plurality of microphones can include generating an image of each of the plurality of microphones and determining the position of each of the plurality of microphones from the image.

Example 4

The method of Example 3, wherein the identifying the position from the image can include receiving a plurality of training images, each of the plurality of training images can indicate a position; and generating a predictive model of the position and an orientation the plurality of microphones based on an input image.

Example 5

The method of Example 1 can further include determining a plurality of beams of a beamforming pattern along which acoustic energy propagates toward the plurality of microphones, the beamforming pattern being based on the position in space and an orientation of the plurality of microphones, selecting a beam of the plurality of beams from which to acquire the acoustic energy propagating toward the plurality of microphones, and recording audio resulting from the acoustic energy acquired from the sampled beam as the sensed audio.

Example 6

The method of Example 1, wherein the plurality of microphones can be included in a user device including any of a smartphone, a smartwatch, augmented reality (AR) smartglasses, a tablet computer, a laptop computer, a desktop computer, or a virtual reality heads-mounted display (HMD).

Example 7

The method of Example 1, wherein the plurality of microphones can be disposed on and connected to a corresponding user device of a plurality of user devices.

Example 8

Figure 6:
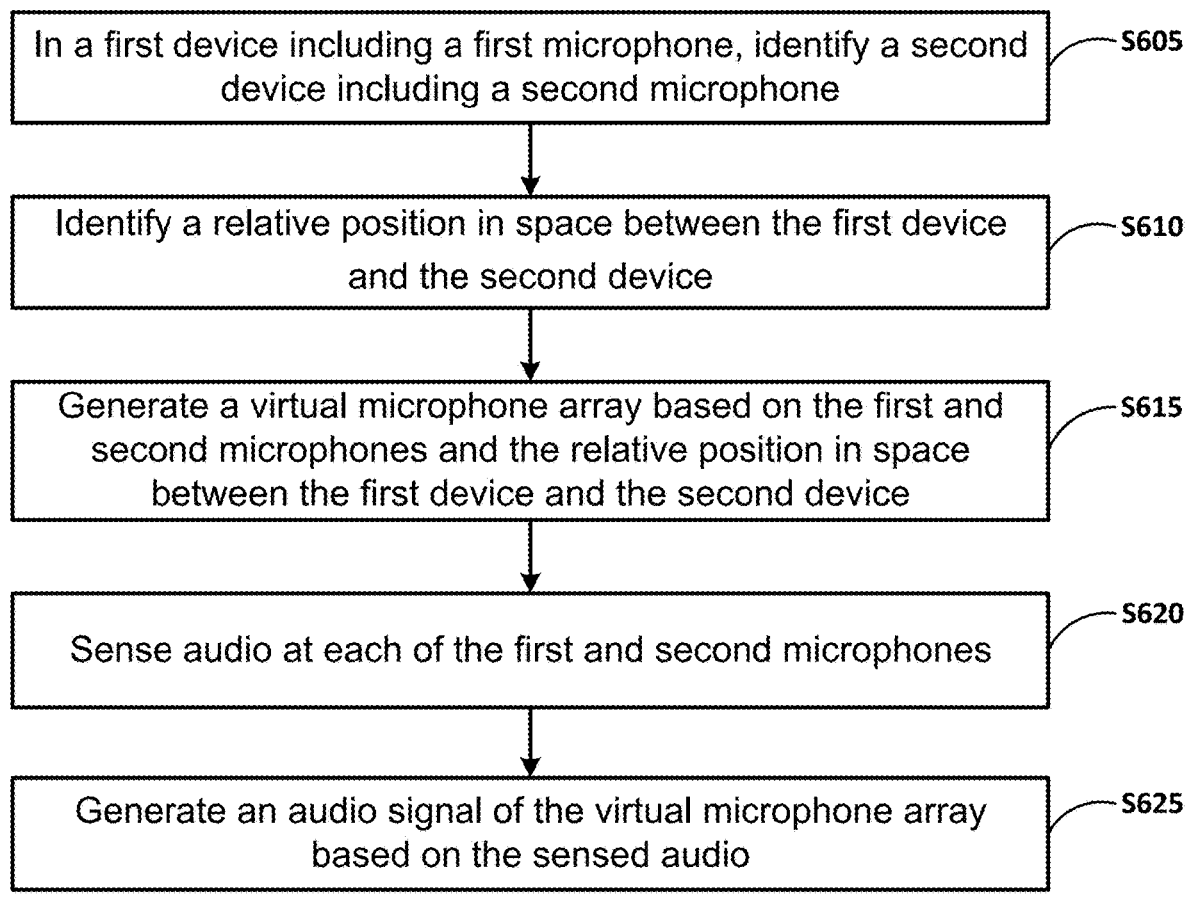
FIG. 6 illustrates a block diagram of an example method of generating a virtual microphone array.

FIG. 6 illustrates a block diagram of an example method of generating a virtual microphone array according to an example implementation. As shown in FIG. 6, in step S605 in a first device including a first microphone, identify a second device including a second microphone. In step S610 identify a relative position in space between the first device and the second device. In step S615 generate a virtual microphone array based on the first and second microphones and the relative position in space between the first device and the second device. In step S620 sense audio at the first and second microphones. In step S625 generate an audio signal of the virtual microphone array based on the sensed audio.

Example 9

The method of Example 8, wherein the relative position in space between the first device and the second device can be a first relative position in space, the method can further include identifying a second relative position in space between the first device and the second device, modifying the virtual microphone array based on the second relative position in space between the first device and the second device, sensing audio at the first and second microphones, and generating an audio signal of the modified virtual microphone array based on the sensed audio.

Example 10

The method of Example 8, wherein identifying the position in space between the first device and the second device can include generating an image of the first device and the second device and determining the position of the first device and the second device from the image.

Example 11

The method of Example 10, wherein the identifying the position from the image can include receiving a plurality of training images, the plurality of training images indicating a position; and generating a predictive model of the position and the orientation of the first device and the second device based on an input image.

Example 12

The method of Example 8 can further include determining a plurality of beams of a beamforming pattern along which acoustic energy propagates toward the plurality of microphones, the beamforming pattern being based on the position in space and an orientation of the plurality of microphones, selecting a beam of the plurality of beams from which to acquire the acoustic energy propagating toward the plurality of microphones, and recording audio resulting from the acoustic energy acquired from the sampled beam as the sensed audio.

Example 12

The method of Example 8, wherein the first device and the second device can include any of a smartphone, a smartwatch, augmented reality (AR) smartglasses, a tablet computer, a laptop computer, a desktop computer, or a virtual reality heads-mounted display (HMD).

Example 13

A method can include any combination of one or more of Example 1 to Example 12.

Example 14

A non-transitory computer-readable storage medium comprising instructions stored thereon that, when executed by at least one processor, are configured to cause a computing system to perform the method of any of Examples 1-13.

Example 15

An apparatus comprising means for performing the method of any of Examples 1-13.

Example 16

An apparatus comprising at least one processor and at least one memory including computer program code, the at least one memory and the computer program code configured to, with the at least one processor, cause the apparatus at least to perform the method of any of Examples 1-13.

Example 17: An apparatus, comprising memory and processing circuitry coupled to the memory, the processing circuitry being configured to identify a plurality of microphones, each of the plurality of microphones being disposed on and connected to a corresponding user device of a plurality of user devices; determine a position in space of each of the plurality of microphones; generate a beam along which acoustic energy propagates toward the plurality of microphones, the beam being based on the position in space of each of the plurality of microphones and define a range of directions from which the acoustic energy is sampled; and recording audio resulting from the acoustic energy acquired from the sampled beam.

It is noted that, for camera-based tacking, there are several permutations:
- Glasses camera tracks the phone or watch
- Phone camera tracks the glasses or watch
- Device camera tracks microphones in the room, e.g., smart speaker
- Smart displays with camera track user-worn devices (glasses, watch, phone)
- The system may be using one or a plurality of these in combination It is also noted that more than one user device can track other user devices, e.g., one group of devices may track another group.

Specific structural and functional details disclosed herein are merely representative for purposes of describing example embodiments. Example embodiments, however, may be embodied in many alternate forms and should not be construed as limited to only the embodiments set forth herein.

Example implementations can include a non-transitory computer-readable storage medium comprising instructions stored thereon that, when executed by at least one processor, are configured to cause a computing system to perform any of the methods described above. Example implementations can include an apparatus including means for performing any of the methods described above. Example implementations can include an apparatus including at least one processor and at least one memory including computer program code, the at least one memory and the computer program code configured to, with the at least one processor, cause the apparatus at least to perform any of the methods described above.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. A method comprising:
   identifying a plurality of microphones;
   generating a model of a position and an orientation of the plurality of microphones based on an input image;
   identifying a relative position in space of the plurality of microphones based on the model;
   generating a virtual microphone array based on the plurality of microphones and the relative position in space of the plurality of microphones;
   sensing audio at the plurality of microphones; and
   generating an audio signal of the virtual microphone array based on the sensed audio.

2. The method of claim 1, wherein the relative position in space of the plurality of microphones is a first relative position in space, the method further comprising:
   identifying a second relative position in space of the plurality of microphones;
   modifying the virtual microphone array based on the second relative position in space of the plurality of microphones;
   sensing audio at the plurality of microphones; and
   generating an audio signal of the modified virtual microphone array based on the sensed audio.

3. The method of claim 1, wherein identifying the relative position in space of the plurality of microphones includes generating an image of the plurality of microphones and determining the position of the plurality of microphones from the image.

4. The method of claim 1, wherein the identifying of the position from the image includes receiving a plurality of training images, the plurality of training images indicating the position of the plurality of microphones, and the model is a predictive model.

5. The method of claim 1, further comprising:
   determining a plurality of beams of a beamforming pattern along which acoustic energy propagates toward the plurality of microphones, the beamforming pattern being based on the relative position in space and an orientation of the plurality of microphones;
   selecting a beam of the plurality of beams from which to acquire the acoustic energy propagating toward the plurality of microphones; and
   recording audio resulting from the acoustic energy acquired from the selected beam as the sensed audio.

6. The method of claim 1, wherein the plurality of microphones are included in a user device including any of a smartphone, a smartwatch, augmented reality (AR) smart-glasses, a tablet computer, a laptop computer, a desktop computer, or a virtual reality heads-mounted display (HMD).

7. The method of claim 1, wherein the plurality of microphones are disposed on and connected to a corresponding user device of a plurality of user devices.

8. A method comprising:
- in a first device including a first microphone, identifying a second device including a second microphone;
- generating a model of a position and an orientation of the first device and the second device based on an input image;
- identifying a relative position in space between the first device and the second device based on the model;
- generating a virtual microphone array based on the first and second microphones and the relative position in space between the first device and the second device;
- sensing an audio at the first and second microphones; and
- generating an audio signal of the virtual microphone array based on the sensed audio.

9. The method of claim 8, wherein the relative position in space between the first device and the second device is a first relative position in space, the method further comprising:
- identifying a second relative position in space between the first device and the second device;
- modifying the virtual microphone array based on the second relative position in space between the first device and the second device;
- sensing audio at the first and second microphones; and
- generating an audio signal of the modified virtual microphone array based on the sensed audio.

10. The method of claim 8, wherein identifying the relative position in space of between the first device and the second device includes generating an image of the first device and the second device and determining the position of the first device and the second device from the image.

11. The method of claim 8, wherein the identifying of the position from the image includes receiving a plurality of training images, the plurality of training images indicating the position of the first device and the second device, and the model is a predictive model.

12. The method of claim 8, further comprising:
- determining a plurality of beams of a beamforming pattern along which acoustic energy propagates toward the first and second microphones, the beamforming pattern being based on the relative position in space and an orientation of the first device and the second device;
- selecting a beam of the plurality of beams from which to acquire the acoustic energy propagating toward the first device and the second device; and
- recording audio resulting from the acoustic energy acquired from the selected beam as the sensed audio.

13. The method of claim 8, wherein the first device and the second device include any of a smartphone, a smartwatch, augmented reality (AR) smartglasses, a tablet computer, a laptop computer, a desktop computer, or a virtual reality heads-mounted display (HMD).

14. A non-transitory computer-readable storage medium comprising instructions stored thereon that, when executed by at least one processor, are configured to cause a computing device to:
- identify a plurality of microphones;
- generate a model of a position and an orientation of the plurality of microphones based on an input image
- identify a relative position in space of the plurality of microphones based on the model;
- generate a virtual microphone array based on the plurality of microphones and the relative position in space of the plurality of microphones;
- sensing audio at the plurality of microphones; and
- generate an audio signal of the virtual microphone array based on the sensed audio.

15. The non-transitory computer-readable storage medium of claim 14, wherein the relative position in space of the plurality of microphones is a first relative position in space, the instructions further comprising:
- identifying a second relative position in space of the plurality of microphones;
- modifying the virtual microphone array based on the second relative position in space of the plurality of microphones;
- sensing audio at the plurality of microphones; and
- generating an audio signal of the modified virtual microphone array based on the sensed audio.

16. The non-transitory computer-readable storage medium of claim 14, wherein identifying the relative position in space of the plurality of microphones includes generating an image of the plurality of microphones and determining the position of the plurality of microphones from the image.

17. The non-transitory computer-readable storage medium of claim 14, wherein the identifying of the position from the image includes receiving a plurality of training images, the plurality of training images indicating the position of the plurality of microphones, and the model is a predictive model of the position and an orientation the plurality of microphones based on an input image.

18. The non-transitory computer-readable storage medium of claim 14, further comprising:
- determining a plurality of beams of a beamforming pattern along which acoustic energy propagates toward the plurality of microphones, the beamforming pattern being based on the position in space and an orientation of the plurality of microphones;
- selecting a beam of the plurality of beams from which to acquire the acoustic energy propagating toward the plurality of microphones; and
- recording audio resulting from the acoustic energy acquired from the selected beam as the sensed audio.

19. The non-transitory computer-readable storage medium of claim 14, wherein the plurality of microphones are included in a user device including any of a smartphone, a smartwatch, augmented reality (AR) smartglasses, a tablet computer, a laptop computer, a desktop computer, or a virtual reality heads-mounted display (HMD).

20. The non-transitory computer-readable storage medium of claim 14, wherein the plurality of microphones are disposed on and connected to a corresponding user device of a plurality of user devices.

* * * * *